Patented Sept. 22, 1936

2,055,415

UNITED STATES PATENT OFFICE 2,055,415

METHOD OF TREATING HYDROCARBONS

Boris Malishev, Berkeley, Calif., assignor to Shell Development Company, San Francisco, Calif., a corporation of Delaware No Drawing. Application December 2, 1933, Serial No. 700,751

5 Claims. (Cl. 196—10)

This invention relates to the treatment of organic compounds for converting them by means of phosphorus pentoxide into substances having boiling temperature higher than those of the initial compounds and is particularly directed to the method for the manufacture of synthetic hydrocarbon materials from unsaturated hydrocarbons by such means.

It is one of the objects of the invention to provide a convenient and economical method for converting unsaturated hydrocarbons, either in the state of substantial purity or in more or less diluted commercial mixtures, like condensable or incondensable products of cracking, which usually contain large proportions of unsaturated hydrocarbons, into valuable hydrocarbon mixtures boiling within relatively high-boiling ranges and having consistency and desirable characteristics of gasoline or other motor fuels, or lubricating oils, or resins, or other high-boiling mineral oil products.

While a large number of agents were known to possess the property of promoting polymerization or condensation of unsaturated hydrocarbons, such, for example, as concentrated sulfuric acid, anhydrous $AlCl_3$, etc., their use normally involves certain difficulties (formation of objectionable sludges, rapid exhaustion of the contact agent, etc.), which make practical applications of the methods employing such agents quite unattractive and sometimes entirely prohibitive.

I have discovered that under certain temperature and pressure conditions anhydrous phosphorus pentoxide ($P_2O_5$) exhibits excellent catalytic activity when present in a water-free mixture of organic substances, particularly unsaturated hydrocarbons, such as secondary or tertiary olefines, diolefines, acetylene and/or cyclic hydrocarbons, which are capable of direct addition of a halogen. Such unsaturated hydrocarbons can be readily polymerized to various degrees by regulating reaction temperatures, time and pressures, and concentrations of the catalyst and the reacting substances. The resulting products may be either substantially saturated hydrocarbons or may contain intermediate less saturated polymers, as well as residual unreacted initial materials, and also, if relatively intense reaction conditions are employed, certain quantities of decomposition products formed by cracking. I have found that phosphorous pentoxide, while being an active polymerizing catalyst, is not corrosive, does not form objectionable reaction by-products and its activity can be conveniently controlled.

My process renders itself as a highly useful means for preparing synthetic products, such as high grade motor fuels and lubricating oils, from either relatively simple hydrocarbon products (substantially pure ethylene, propylene, butylene, amylene, etc. singly or in admixture) or fractions containing olefines, which predominantly contain the same number of carbon atoms to the molecule, or comparatively complex mixtures, such as cracked mineral oil distillates or cracked vapors or gases. Sulfurated (sulfides) or other sulfur-bearing organic substances, such as mercaptans, and halogenated hydrocarbons and similar hydrocarbon derivatives can also be condensed either mutually or with other substances.

While, as stated before, the process of this invention may be used for treating vapors or gases, by passing them through a mass of $P_2O_5$, preferably supported on a suitable carrier, I prefer to practice my treating method by suspending a quantity of finely divided $P_2O_5$ in a liquid, which may be the mixture to be treated; or $P_2O_5$ may be suspended in a liquid which is one of the substances to be treated, while the other, such as olefines, may be introduced in the vapor state into this $P_2O_5$ suspension below the surface thereof and thus caused to combine with the liquid substance; in another alternative form of my invention I may suspend $P_2O_5$ in an auxiliary liquid which may or may not take part in the reaction promoted by $P_2O_5$, but whose purpose is to serve as a carrier for $P_2O_5$; reacting substances are then introduced into the suspension and are caused to react by applying heat and pressure to the mixture; as an auxiliary liquid I prefer to employ one which acts as a solvent for the reacting substances and which may or may not be readily separated from the reaction product. Gasoline, kerosene or stove oil may be used, for example, in treating light olefines, or their mixtures, or cracked vapors or gases, for the production of synthetic gasoline or lubricating oils, etc.

Although it is possible to effect the polymerization of unsaturated organic compounds by using $P_2O_5$ alone as catalyst, I have found that similarly to my process described in the Patent No. 1,914,953, is is advantageous, when suspending $P_2O_5$ in a liquid, to employ supplemental treating agents, apparently having peptizing effect on the $P_2O_5$ suspension. Among such supplemental refining agents may be mentioned oxidized mineral oils or bitumens, such as asphalt, coal tar pitch, wood tar pitch, hardwood pitch, etc., which contain organic oxy compounds, also aldehydes, ketones and salts of organic acids, comprising such compounds as benzophenone, copper oleate, copper acetate, copper naphthenate, etc. In lieu or in conjunction with the aforementioned supplemental refining agents may be used metallic halides, such as $CuCl_2$, $FeCl_3$, $SbCl_3$ etc.

I have also found that in order to stabilize $P_2O_5$ suspensions which may or may not contain supplemental refining agents mentioned above, it is very beneficial to incorporate into these suspensions a relatively small quantity of a stabilizing agent having the effect of a protective colloid; among such agents are lamp black, fuller's earth, finely divided silica, etc.

In carrying out my invention in practice, I preferably operate my process within the temperature range of 150–400° C., or thereabouts, and under moderate superatmospheric pressures usually not exceeding about 50 atmospheres gauge (about 750 lbs./sq. in.) although higher pressures may be employed. The general rule, applicable in reactions of this type that an increase either in the reaction temperature or in pressure, or in the concentration of the catalyst, favors the polymerizing activity of a catalyst, provides a variety of means for regulating the progress of polymerization of unsaturated hydrocarbons or substitute derivatives. The following illustrative examples are intended to demonstrate more specifically some of the applications of this invention:

I. 5 gms. of phosphorus pentoxide, 2 gms. lamp black and 0.5 cc. cresol were added to 1000 cc. of diisobutylene, and the mixture was heated with stirring for about 2 hours at 250° C. The obtained product freed of the refining agents boiled up to about 300° C.; the distilled-off gasoline had a good color, sweet odor, low gum, and a high antiknock value.

II. 5 gms. of $P_2O_5$, 2 gms. lamp black and 0.5 cc. cresol were added to 1000 cc. amylene, and the mixture was heated with stirring for about 2 hours at 250° C., developing a pressure of about 20 atmospheres (300 lbs./sq. in.) gauge. The obtained polymerization product had characteristics similar to those of the product of the Example I. This treatment, when carried out at about 400° C., yielded a product of a more naphthenic character (i. e. saturated) with a higher content of higher-boiling hydrocarbons than the first product. Thus, by intensifying reactive conditions a hydrocarbon oil having a consistency of high grade lubricating oil can be made from unsaturated hydrocarbons.

III. 5 gms. of phosphorus pentoxide, 2 gms. lamp black and 0.5 cc. cresol were added to 1000 cc. of liquefied butylene, $C_4H_8$, and the mixture was heated with stirring for about 2 hours at 300° C., developing a pressure of about 50 atmospheres (735 lbs./sq. in.) gauge. 90% of the treated product boiled in the range of 83° C. to 224° C. and had properties of a good gasoline; about 5% of the polymerized product had properties of a lubricating oil.

IV. 10,000 cc. of a vapor phase cracked light distillate were mixed with 100 gms. $P_2O_5$, 20 gms. lamp black, 10 gms. cresol and heated for 2 hours at 250° C. while stirring. The polymerized product was distilled in vacuum and yielded about 400 gms. of a good viscous lubricating oil.

Furthermore, my invention can be used as a method of refining oils which contain either small or large quantities of unsaturated, i. e. polymerizable compounds. For example, the temperature-viscosity characteristic of a lubricating oil, or stability against oxidation of a transformer oil, can be markedly improved by treating either of them with anhydrous $P_2O_5$ under herebefore disclosed conditions of temperature and pressure, whereby polymerizable compounds present in the oil are polymerized into stable more saturated compounds with corresponding improvement in quality of the treated oil. Such a treatment with $P_2O_5$ may be accompanied by introducing a polymerizable mixture into the oil undergoing said treatment.

The process of this invention may be carried out in a continuous manner, for example, by maintaining a continuous stream of a suspension of a catalytic mass containing anhydrous $P_2O_5$ in a suitable liquid medium and maintaining a continuous stream of a hydrocarbon mixture containing unsaturated hydrocarbons, or other organic substances to be treated by this method, contacting and intermingling the two streams in regulated proportion, and, or while, passing the commingled streams at a regulated rate through a zone maintained under conditions of reaction temperature and pressure, separating the products of reaction from the catalytic mass, supply compounds to be treated to the reaction zone and recycling at least a portion of the recovered catalytic mass through the reaction zone.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained.

I claim as my invention:

1. Process of preparing higher-boiling organic substances from low-boiling organic compounds capable of polymerization or condensation comprising treating the low-boiling compounds in an anhydrous condition at an elevated polymerizing temperature with anhydrous $P_2O_5$ for a time sufficient to convert substantially all of the said low-boiling compounds to higher-boiling substances, while maintaining said anhydrous $P_2O_5$ suspended in a solvent for said organic compounds in the presence of an oxy-organic compound capable of peptizing the suspended $P_2O_5$.

2. Process of preparing higher-boiling organic substances from low-boiling organic compounds capable of polymerization or condensation comprising treating the low-boiling compounds in an anhydrous condition at an elevated polymerizing temperature with anhydrous $P_2O_5$ for a time sufficient to convert substantially all of the said low-boiling compounds to higher-boiling substances, while maintaining said anhydrous $P_2O_5$ suspended in a solvent for said organic compounds in the presence of a sufficient quantity of a finely divided protective colloid to stabilize said suspension of $P_2O_5$.

3. Process of preparing higher-boiling hydrocarbons from low-boiling unsaturated hydrocarbons comprising treating the low-boiling unsaturated hydrocarbons in an anhydrous condition at an elevated polymerizing temperature with anhydrous $P_2O_5$ for a time sufficient to convert substantially all of the said low-boiling hydrocarbons to higher-boiling hydrocarbons, while maintaining said anhydrous $P_2O_5$ suspended in a solvent for said unsaturated hydrocarbons in the presence of an oxyorganic compound capable of peptizing the suspended $P_2O_5$.

4. Process for preparing synthetic oils from olefines of less than 6 carbon atoms comprising treating said olefines in an anhydrous condition under sufficient pressure to maintain them in the liquid state, at a temperature between 150–400° C., with anhydrous $P_2O_5$ for a time sufficient to convert substantially all of said olefines to higher boiling hydrocarbons including those suitable for motor fuels and lubricating oils, while maintaining said anhydrous $P_2O_5$ suspended in a solvent for said hydrocarbons in the presence of an oxy-organic compound capable of peptizing the suspended $P_2O_5$, and separating said motor fuels and lubricating oils from the remainder of the reaction products by fractional distillation.

5. The continuous process of preparing higher-boiling organic substances from low-boiling organic compounds capable of polymerization or condensation comprising maintaining a continuous stream of the catalytic mass comprising an effective quantity of anhydrous $P_2O_5$ suspended in a solvent for said organic compounds and maintained in the dispersed state by means of an oxy-organic compound capable of peptizing $P_2O_5$, maintaining a continuous stream of said low-boiling organic compounds, contacting and intermingling the two streams in regulated proportions at an elevated temperature for a time which is sufficient to convert substantially all of said organic compounds into higher-boiling substances, separating the contacted catalytic mass from the mixture of the two streams, and combining at least a portion of the separated catalytic mass with the first stream of the catalytic mass.

BORIS MALISHEV.